United States Patent
Chalin

[19]

[11] Patent Number: 6,131,930
[45] Date of Patent: Oct. 17, 2000

[54] AXLE ALIGNMENT SYSTEM

[75] Inventor: Thomas N. Chalin, Lucas, Tex.

[73] Assignee: Watson & Chalin Manufacturing, Inc., McKinney, Tex.

[21] Appl. No.: 09/096,080

[22] Filed: Jun. 11, 1998

[51] Int. Cl.⁷ .................................. B60G 9/02; B62C 1/04
[52] U.S. Cl. ........................................................ 280/86.75
[58] Field of Search ........................ 280/86.75, 124.151, 280/86.751, 86.754

[56] References Cited

U.S. PATENT DOCUMENTS

| Re. 30,308 | 6/1980 | Masser ................................. 280/713 |
| 3,612,572 | 10/1971 | Raidel . |
| 3,960,388 | 6/1976 | Strader et al. ........................... 280/693 |
| 4,132,432 | 1/1979 | Raidel . |
| 4,261,597 | 4/1981 | Vandenberg . |
| 4,267,896 | 5/1981 | Hendriksen . |
| 4,500,110 | 2/1985 | McWhorter et al. . |
| 4,595,216 | 6/1986 | Ware . |
| 4,762,337 | 8/1988 | Raidel . |
| 5,016,906 | 5/1991 | Cadden . |
| 5,060,962 | 10/1991 | McWethy ............................. 280/304.1 |
| 5,201,898 | 4/1993 | Pierce . |
| 5,403,031 | 4/1995 | Gottschalk et al. . |

OTHER PUBLICATIONS

Neway Brochure entitled The Original and Proven Non-Welded Axle Alignment Feature From NEWAY™ 1995.
Neway Catalog pages entitled "NEWAY Trak Star™ RL–228 trailer Air Suspension"dated 1996.
Hendrickson Catalog pages entitled "Intraax Pivot Connection Simplifies Axle Alignment and Maintenance" undated.

Primary Examiner—Paul N. Dickson
Assistant Examiner—Tony Winner
Attorney, Agent, or Firm—Konneker & Smith, P.C.

[57] ABSTRACT

An axle alignment system is disclosed which permits convenient and efficient lateral alignment of an axle relative to a vehicle frame, without causing vertical displacement of the vehicle frame, and without requiring welding after the alignment operation. In a described embodiment, an axle alignment system includes rotationally engaged members, each of which has an eccentrically disposed opening formed therethrough. A fastener received in the openings is displaced horizontally, but not vertically, when the members are rotated relative to each other.

22 Claims, 6 Drawing Sheets

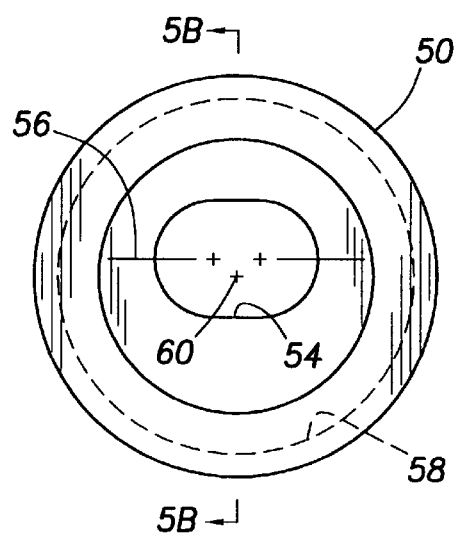
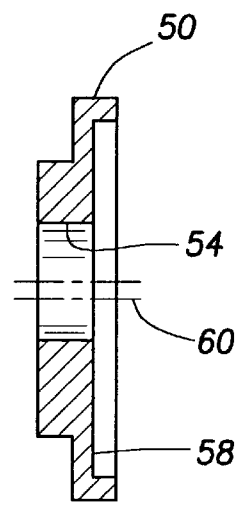
FIG.5A  FIG.5B
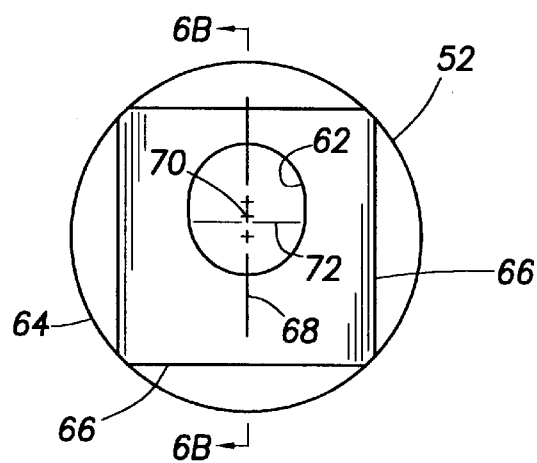
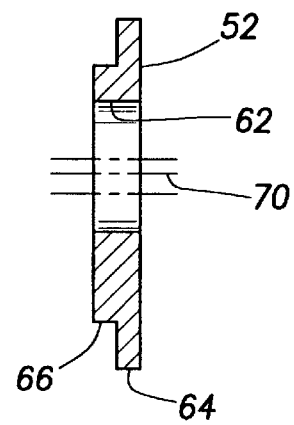
FIG.6A  FIG.6B

AXLE ALIGNMENT SYSTEM

BACKGROUND OF THE INVENTION

The present invention relates generally to vehicle suspension systems and, in an embodiment described herein, more particularly provides an axle alignment system.

Aligning an axle relative a lateral axis of a vehicle frame upon assembly of a suspension system to the frame presents a variety of challenges. The alignment operation must be convenient and efficient, so that it may be performed quickly and inexpensively in order to reduce production costs. Additionally, the alignment operation must not induce other structural faults or misalignments in the vehicle or its suspension system.

In one common type of axle alignment operation, a member through which a fastener is inserted is welded to a hanger bracket or side rail assembly of the vehicle upon alignment of the axle parallel to a lateral axis of the vehicle. However, if the axle is not aligned correctly the first time, this method requires lengthy rework to correct any misalignment. Furthermore, the welding operation is time-consuming and somewhat inconvenient to perform on some vehicle assembly lines. It would, therefore, be desirable in some cases to provide an axle alignment system which does not require welding on the vehicle assembly line.

In another common type of axle alignment operation, the fastener is received in an eccentrically disposed opening formed through a member which is rotationally mounted relative to the vehicle hanger bracket or side rail assembly. When the member is rotated relative to the bracket, the opening and, thus, the fastener, is displaced both horizontally and vertically relative to the bracket. This method affords some direct control over horizontal displacement of the axle and does not require any welding, since tightening of the fastener after the alignment operation secures the member relative to the bracket, but it does induce some vertical misalignment in the vehicle suspension system. This is due to the fact that the fastener displaces vertically when the member is rotated. Such vertical misalignment can cause leaning of the vehicle frame and is very undesirable.

In a somewhat similar type of axle alignment system, the fastener is also received in an eccentrically disposed opening formed through a member which is rotationally mounted relative to the vehicle hanger bracket or side rail assembly. However, in this axle alignment system, when the member is rotated relative to the bracket, the fastener is displaced only horizontally, but a collar or other abutment attached to the hanger bracket and in contact with the member displaces vertically. Such vertical displacement of the collar prevents desirable retainment of the collar by an adjacent receiving collar.

From the foregoing, it can be seen that it would be quite desirable to provide an axle alignment system which does not require welding of components of the system on a vehicle assembly line, but which permits an axle to be laterally aligned, without also inducing vertical misalignment in the vehicle suspension system. It is accordingly an object of the present invention to provide such an axle alignment system and associated methods of aligning vehicle axles.

SUMMARY OF THE INVENTION

In carrying out the principles of the present invention, in accordance with an embodiment thereof, an axle alignment system is provided which permits convenient and efficient lateral alignment of an axle relative to a vehicle frame, without causing vertical displacement of the vehicle frame, and without requiring welding after the alignment operation. Associated methods are also provided by the present invention.

In broad terms, an axle alignment system is provided for a vehicle, which includes an elongated first opening disposed generally parallel to a longitudinal axis of the vehicle, a first profile eccentrically positioned relative to the first opening, an elongated second opening rotationally disposed about a lateral axis of the vehicle, and a second profile eccentrically positioned relative to the second opening and engaged with the first profile. The first opening and profile may be formed on a first member rigidly attached to a hanger bracket or side rail assembly of a suspension system, or the first opening and first profile may be integrally formed on the hanger bracket or side rail assembly. The first and second openings may be elongated and oval shaped, and the first and second profiles may be at least partially circular shaped.

In another aspect of the present invention, an axle alignment system is provided for a vehicle, which includes first and second members. The first member includes a first at least partially circular profile and a first elongated opening formed therethrough. The first opening has a longitudinal axis and a lateral axis, and the first opening longitudinal axis is laterally offset from a center of the first profile, such that the first profile is eccentrically disposed relative to the first opening.

The second member includes a second at least partially circular profile and a second elongated opening formed therethrough. The second opening has a longitudinal axis and a lateral axis. The second opening lateral axis is longitudinally offset from a center of the second profile, such that the second profile is eccentrically disposed relative to the second opening.

The first profile is rotationally engaged with the second profile, and the first opening is at least partially aligned with the second opening. A fastener is received in the first and second openings. When the second member is rotated with respect to the first member, the fastener is displaced parallel to a longitudinal axis of the vehicle. In an embodiment described herein, the second member rotates within the first member and does not displace either horizontally or vertically when it is rotated within the first member.

A method of aligning an axle with a lateral axis of a vehicle frame is also provided by the present invention. The method is for use with a vehicle of the type wherein the axle is incorporated in a suspension system of the vehicle, the suspension system including an arm attached to the axle, a bracket attached to the vehicle frame, and a fastener pivotably mounting the arm to the bracket. The method includes the steps of inserting the fastener through first and second openings, the first opening being rigidly mounted relative to the vehicle frame, and rotating the second opening relative to the first opening, thereby generally horizontally, but not generally vertically, displacing the fastener relative to the bracket.

These and other features, advantages, benefits and objects of the present invention will become apparent to one of ordinary skill in the art upon careful consideration of the detailed description of a representative embodiment of the invention hereinbelow and the accompanying drawings.

BRIEF DESCRIPTION OF THE DRAWINGS

FIGS. 5A&B are elevational and cross-sectional views, respectively, of a first member of an axle alignment system embodying principles of the present invention;

FIGS. 6A&B are elevational and cross-sectional views, respectively, of a second member of the axle alignment system embodying principles of the present invention.

DETAILED DESCRIPTION

Figure 1:
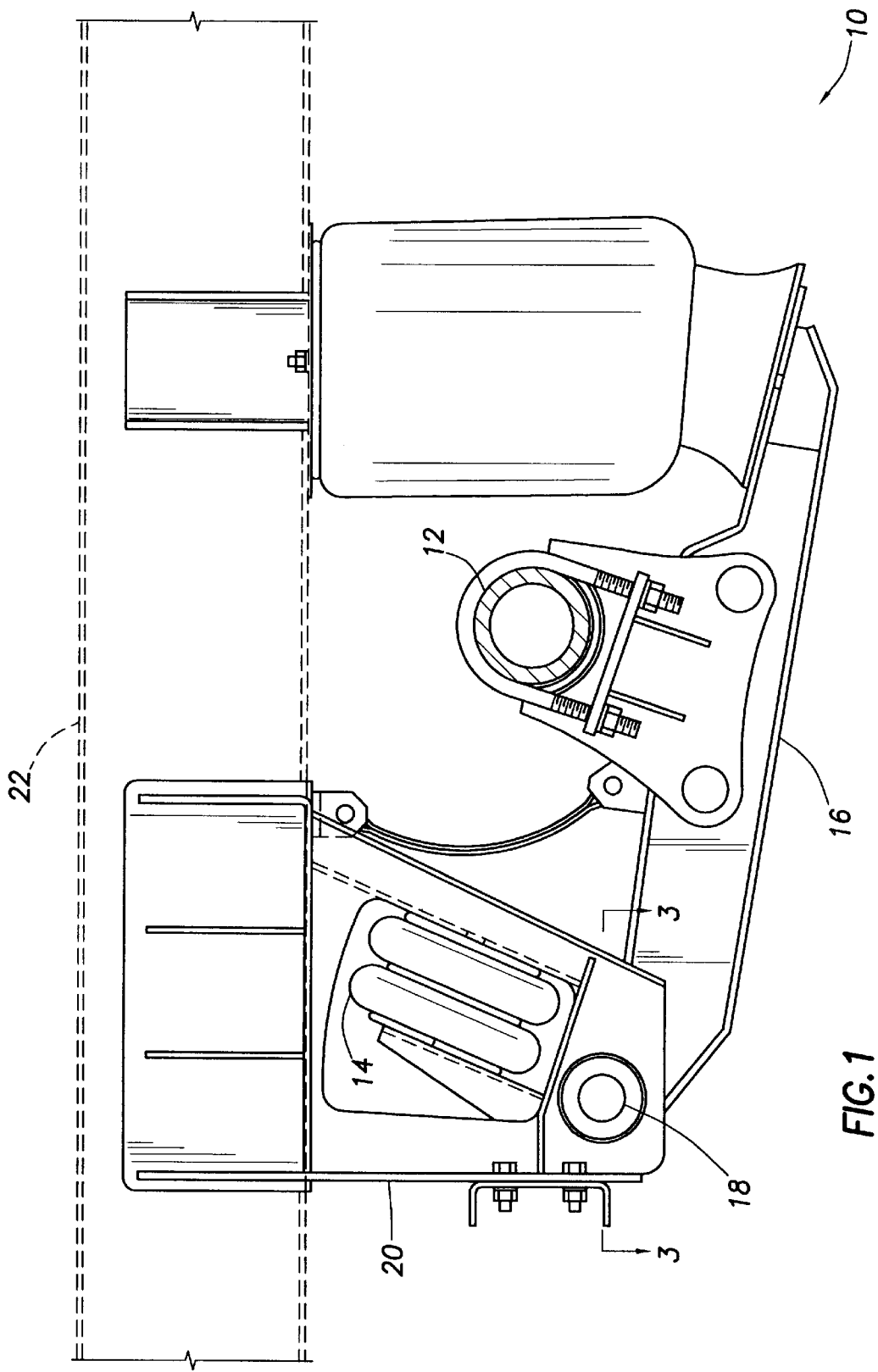
FIG. 1 is a side elevational view of a vehicle suspension system.

Representatively illustrated in FIG. 1 is a vehicle suspension system 10. In the following description of the suspension system 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., without departing from the principles of the present invention.

The suspension system 10 is of the type commonly referred to as a "lift axle" suspension system, due to the fact that a laterally extending axle 12 of the vehicle may be lifted vertically out of engagement with a road surface on which the vehicle is positioned. To lift the axle 12, air pressure is applied to an air bag 14. The air pressure causes the air bag 14 to elongate, thereby pivoting a trailing arm 16 counter-clockwise as viewed in FIG. 1 about a fastener 18 installed laterally through a forward portion of the arm. The fastener 18 is also inserted laterally through a hanger bracket or side rail assembly 20, which extends downwardly from a longitudinally extending frame 22 of the vehicle.

As used herein, the term "vehicle" is used to indicate any means of carrying or transporting something, whether or not motorized, including without limitation trucks, tractors, trailers, etc. Additionally, it is to be clearly understood that the suspension system 10 is shown in FIG. 1 as being only representative of one of a wide variety of types of suspension systems in which principles of the present invention may be incorporated. Thus, principles of the present invention may be incorporated in other types of vehicles and in vehicles having other types of suspension systems. For example, the suspension system 10 could be other than a lift axle suspension system, without departing from the principles of the present invention.

Figure 2:
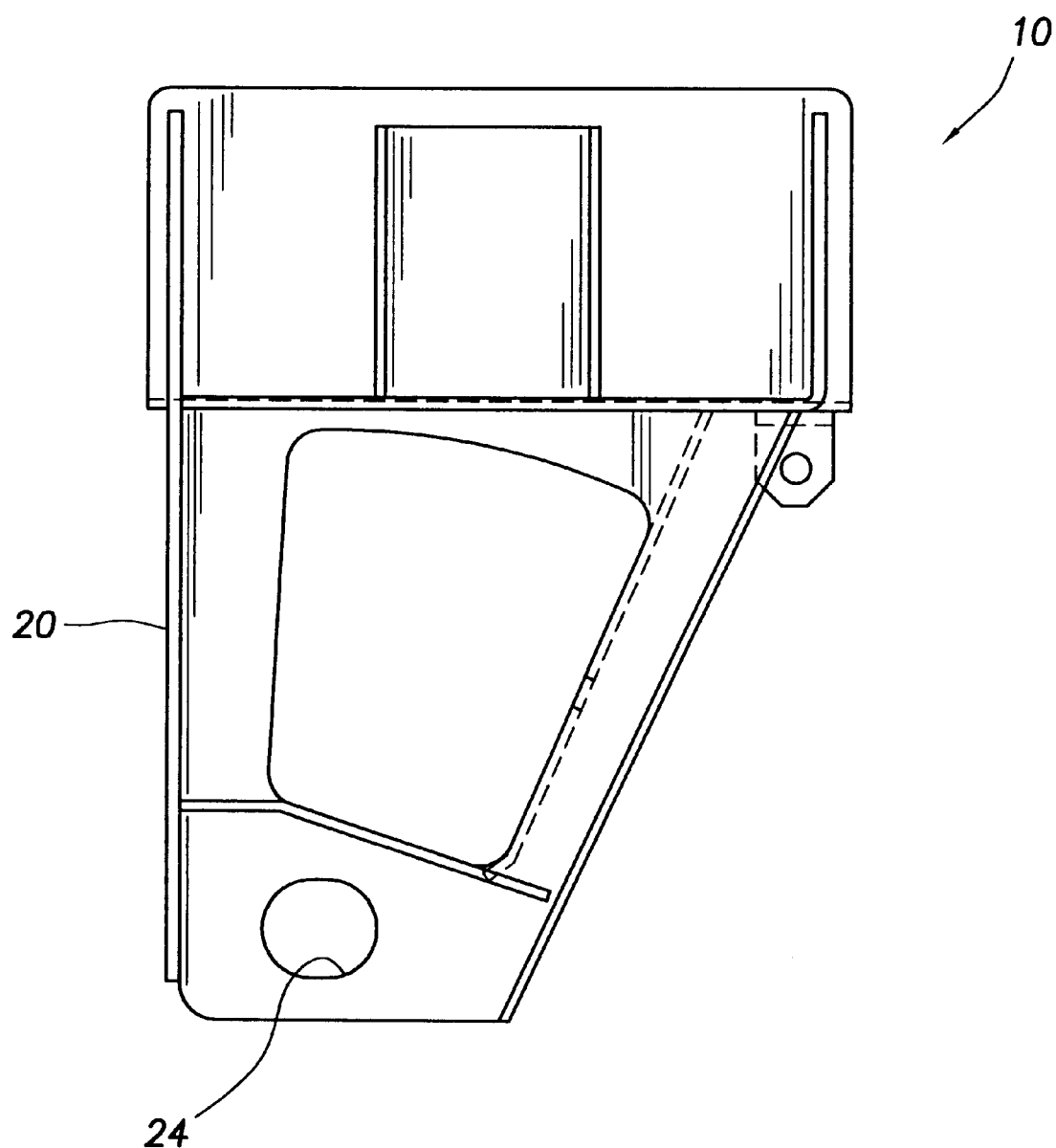
FIG. 2 is a somewhat enlarged elevational view of a side rail assembly of the suspension system of FIG. 1.

Referring additionally now to FIG. 2, the bracket 20 is representatively illustrated apart from the remainder of the suspension system 10. The depicted bracket 20 has an elongated opening 24 formed laterally therethrough. The opening 24 is elongated in a direction which is parallel to a longitudinal axis of the vehicle. It will be readily appreciated by a person skilled in the art that, with the fastener 18 installed laterally through the opening 24, the arm 16 and axle 12 may be displaced longitudinally (i.e., horizontally as viewed in FIG. 1) relative to the vehicle frame 22 by correspondingly displacing the fastener longitudinally within the opening.

Note that the axle 12 extends generally laterally with respect to the frame 22, and there are two sets of the arms 16, brackets 20 and fasteners 18, one set disposed at each end of the axle. Thus, when one of the fasteners 18 is displaced longitudinally, the corresponding end of the axle 12 is likewise displaced longitudinally. Therefore, the axle 12 may be rotated about a vertical axis to align it with a lateral axis of the vehicle by appropriately forwardly or rearwardly displacing one or both of the fasteners 18 as needed.

Figure 3:
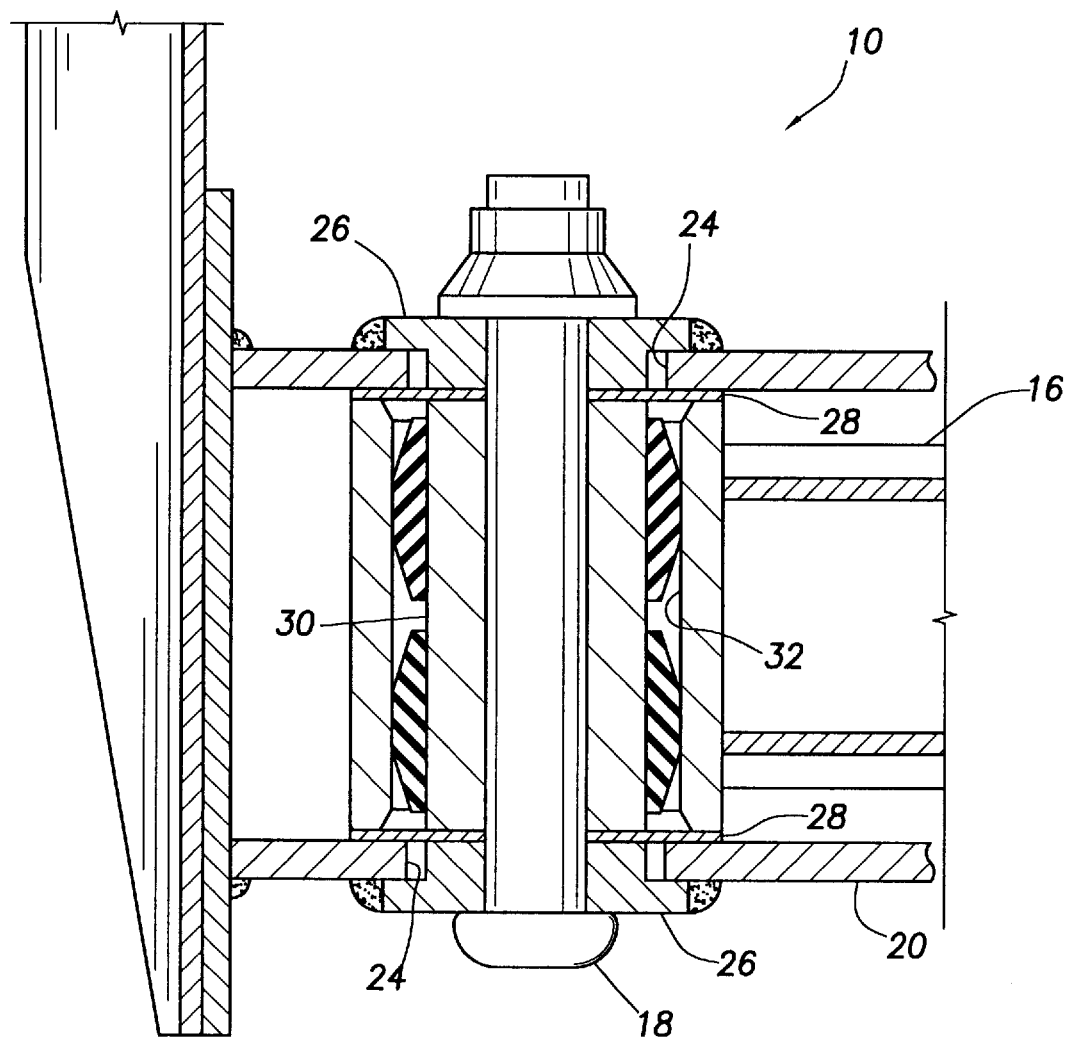
FIG. 3 is a cross-sectional view of an axle alignment system of the suspension system of FIG. 1, taken along line 3—3.

Referring additionally now to FIG. 3, a cross-sectional view of the pivotable attachment of the arm 16 to the bracket 20 is representatively illustrated. In this view it may be clearly seen that the bracket 20 actually has two of the openings 24 formed laterally therethrough. The fastener 18 is received in the openings 24 and passes through weld collars 26, washers 28, a bushing 30, and an opening 32 formed laterally through a forward end of the arm 16.

When the axle 12 has been aligned with the lateral axis of the vehicle, as described above, the fastener 18 is tightened and the weld collars 26 are welded to the bracket 20. In this manner, the alignment of the axle 12 with the vehicle lateral axis is fixed. Thus, the suspension system 10 shown in FIGS. 1–3 is of the type in which there is no direct control over the lateral alignment of the axle 12 (that is, the axle must be rotated into alignment by hand, with the weld collars 26 loosely engaged in the openings 24), and which requires welding upon completion of the axle alignment operation. Another type of welded axle alignment system is described in U.S. Pat. No. 4,261,597, the disclosure of which is incorporated herein by this reference.

Figure 4:
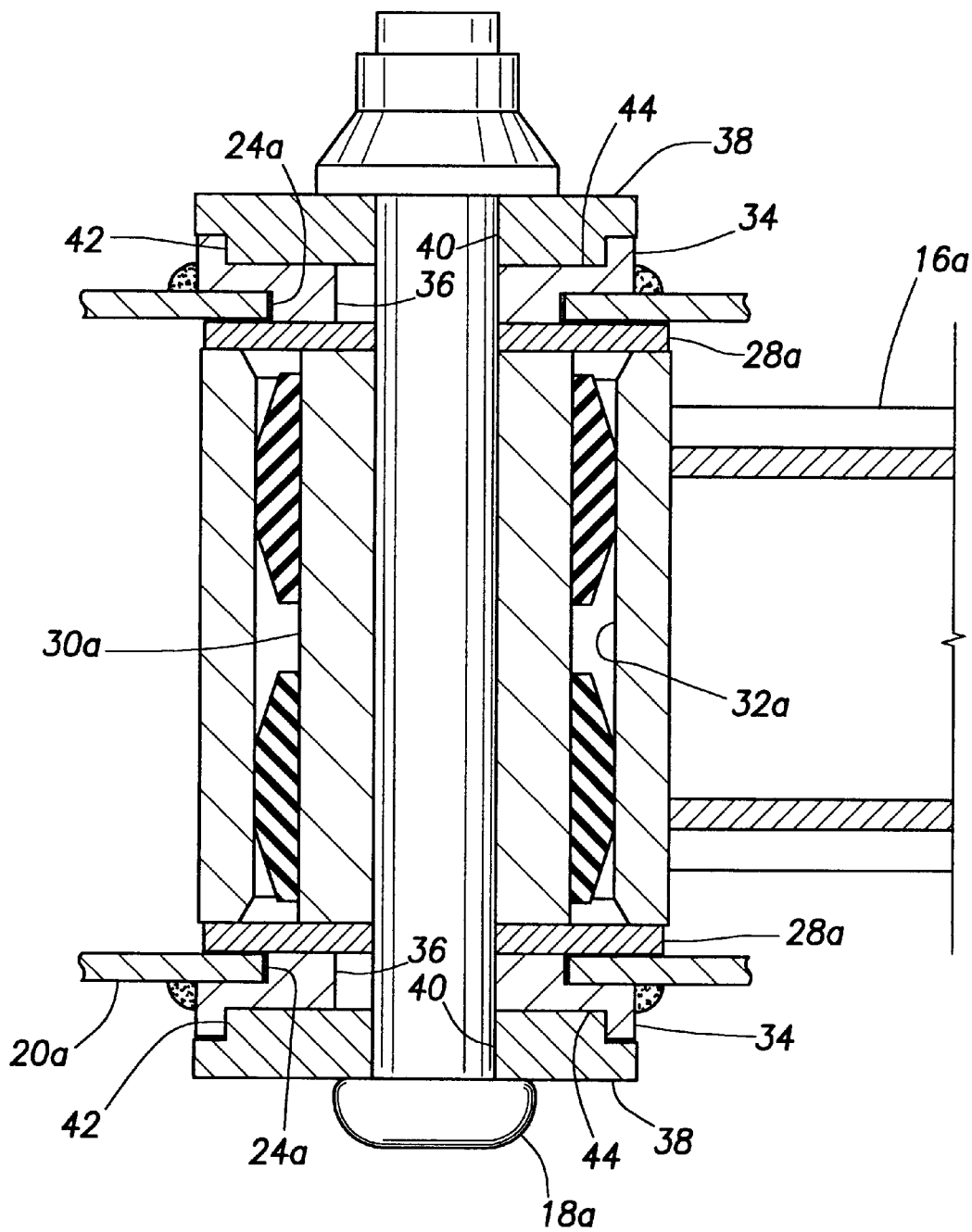
FIG. 4 is a cross-sectional view of another axle alignment system.
Figure 7A:
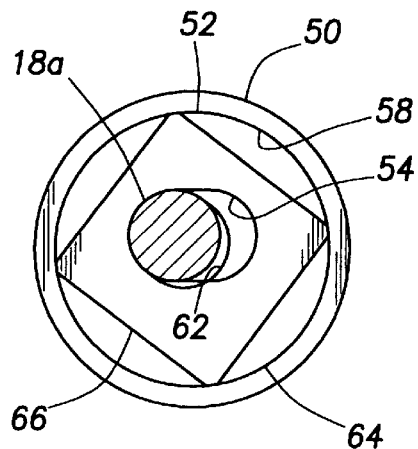
FIGS. 7A–E are partially elevational and partially cross-sectional views of successive rotational engagements of the first and second members, illustrating a method of aligning an axle, the method embodying principles of the present invention.
Figure 7B:
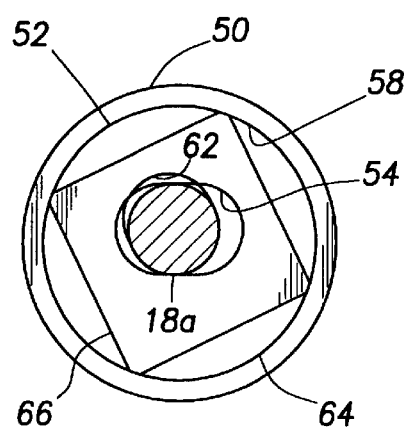
Figure 7C:
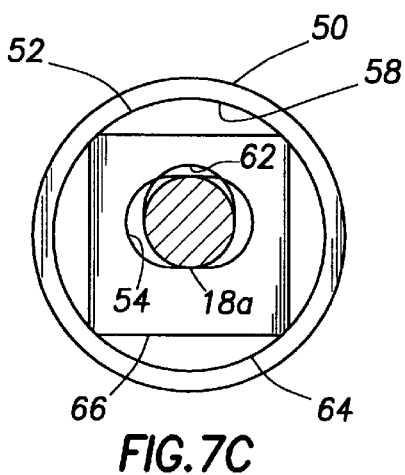
Figure 7D:
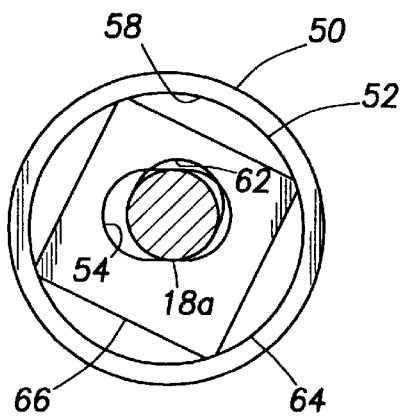
Figure 7E:
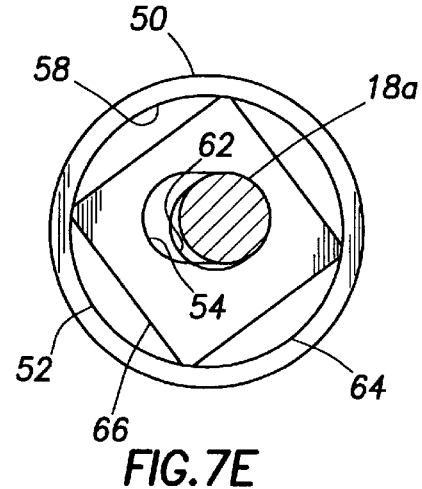

Referring additionally now to FIG. 4, another type of axle alignment system is representatively illustrated. Elements shown in FIG. 4 which are similar to those previously described are indicated using the same reference numbers, with an added suffix "a". In the axle alignment system shown in FIG. 4, weld collars 34 are welded to the hanger 20a prior to final assembly of the suspension system to the vehicle frame. However, the weld collars 34 have enlarged openings 36 formed therethrough which permit both vertical and horizontal displacement of the fastener 18a therein. Conversely, the openings 24a formed through the hanger 20a and in which the weld collars 34 are received are not elongated, but are relatively closely fitted about the weld collars.

In order to perform the axle alignment operation using the system shown in FIG. 4, eccentric cams 38 are disposed between opposite ends of the fastener 18a and the weld collars 34. The eccentric cams 38 have openings 40 formed therethrough which are closely fitted about the fastener 18a. The openings 40 are eccentrically positioned relative to circular shaped shoulders 42 formed on the cams 38. The shoulders 42 are received in circular shaped recesses 44 formed on the weld collars 34.

When the eccentric cams 38 are rotated with respect to the weld collars 34, the openings 40 displace vertically and horizontally, thereby permitting the axle 12 to be rotated about a vertical axis. Other types of eccentric axle alignment systems are disclosed in U.S. Pat. Nos. 3,612,572, 5,201,898, 4,500,110, 5,016,906, 5,403,031, 4,762,337, and 4,132,432, the disclosures of which are incorporated herein by this reference. Note that, in each of these eccentric axle alignment systems, the fastener about which the arm pivots with respect to the bracket is displaced both vertically and horizontally, or a forward end of the trailing arm is otherwise horizontally and vertically displaced, when the axle is rotated about a vertical axis to laterally align the axle with the vehicle frame.

It will be readily appreciated that vertical displacement of the fastener 18a during axle alignment is undesirable. When the fastener 18a is vertically displaced, the forward end of the arm 16a is also vertically displaced, thereby changing the vertical distance between the vehicle frame and the forward end of the arm. This can cause the vehicle frame to tip to one side or the other.

Representatively illustrated in FIGS. 5A&B and FIGS. 6A&B are a weld collar 50 and cam 52, which may be utilized in place of the weld collar 34 and cam 38 shown in FIG. 4. The weld collar 50 may be welded to the bracket 20a prior to final assembly of the suspension system to the vehicle, thereby eliminating the need for welding on the vehicle assembly line after the axle alignment operation. Additionally, use of the weld collar 50 in conjunction with the cam 52 eliminates any vertical displacement of the fastener 18a during axle alignment, thereby preventing any vertical misalignment of the suspension system and any resulting tipping of the vehicle frame.

The weld collar 50 includes an elongated generally oval shaped opening 54 formed therethrough. When attached to the bracket 20a, the opening 54 is elongated or extends in a direction parallel to the longitudinal axis of the vehicle. In other words, a longitudinal axis 56 of the opening is parallel with the vehicle longitudinal axis, that is, horizontally disposed.

An internal generally circular shaped profile or recess 58 is formed on one side of the weld collar 50. A center 60 of the profile 58 is offset from the longitudinal axis 56 of the opening 54, so that the opening 54 is eccentrically disposed relative to the profile 58. On the side opposite the profile 58, the weld collar 50 is configured for insertion into the openings 24a in the bracket 20a.

The cam 52 includes an elongated generally oval shaped opening 62 formed therethrough, and an external generally circular shaped profile or shoulder 64 formed thereon. The profile 64 is complementarily shaped relative to the profile 58 on the weld collar 50. The cam 52 also has wrench flats 66 formed thereon to aid in rotating the cam relative to the weld collar 50 when the profiles 58, 64 are engaged with each other.

The opening 62 has a longitudinal axis 68 which extends through a center 70 of the profile 64. The opening 62 also has a lateral axis 72 which is offset somewhat from the profile center 70, such that the opening 62 is eccentrically disposed relative to the profile 64.

Note that the weld collar 50 and cam 52 depicted in FIGS. 5A&B and FIGS. 6A&B are merely representative of elements of an axle alignment system embodying principles of the present invention. Many variations may be made to these elements without departing from the principles of the present invention. For example, it is not necessary for the profiles 58, 64 to be completely or partially circular in shape, the external wrench flats 66 could be replaced with an internal socket, the profile 58 could be externally formed and the profile 64 could be internally formed, the opening 62 could be centrally instead of eccentrically disposed relative to the profile 64, the weld collar 50 could be formed integrally with the bracket 20 or a portion thereof, etc.

Referring additionally now to FIGS. 7A–E, the axle alignment system is representatively illustrated with the cam 52 rotationally engaged with the weld collar 50, and with the fastener 18a inserted through the openings 54, 62. The profile 58 is engaged with the profile 64 so that, as the cam 52 is rotated with respect to the weld collar 50, the intersection or alignment between the openings 54, 62 displaces horizontally and, thus, the fastener 18a displaces therewith. The opening 54 is shown in solid lines in FIGS. 7A–E for illustrative and descriptive clarity, it being understood that portions of the opening 54 are not visible with the cam 52 engaged with the weld collar 50 as shown.

With the weld collar 50 welded or otherwise attached to the bracket 20a as described above (i.e., with the opening 54 longitudinal axis 56 disposed horizontally and parallel to the vehicle longitudinal axis), the fastener 18a displaces horizontally, but not vertically, as the cam 52 is rotated relative to the weld collar. This is due to the fact that the opening 62 is rotationally disposed about a lateral axis of the vehicle while the opening 54 is disposed generally parallel to a longitudinal axis of the vehicle, and the opening 54 is eccentrically disposed relative to the profile 58. Thus, vertical misalignment of the suspension system is not caused by rotating the axle about a vertical axis using the axle alignment system shown in FIGS. 5A–7E.

The weld collar 50 and cam 52 may be utilized in the suspension system 10 shown in FIG. 1. Prior to assembly of the suspension system 10 to the vehicle frame 22, two of the weld collars 50 may be welded to the bracket 20 in a manner similar to that in which the weld collars 34 are welded to the bracket 20a as shown in FIG. 4. The cams 52 are substituted for the cams 38 when the suspension system 10 is attached to the vehicle frame 22. Alignment of the axle 12 relative to the frame 22 may then be accomplished by rotating the cams 52 relative to the weld collars 50 to thereby horizontally, but not vertically, displace the forward end of the arm 16 as needed to rotate the axle 12 about a vertical axis and align the axle with a lateral axis of the vehicle.

The foregoing detailed description is to be clearly understood as being given by way of illustration and example only, the spirit and scope of the present invention being limited solely by the appended claims.

What is claimed is:

1. An axle alignment system for a vehicle, the axle alignment system comprising:

an elongated first opening disposed generally parallel to a longitudinal axis of the vehicle;

a first profile eccentrically positioned relative to the first opening;

an elongated second opening rotationally disposed about a lateral axis of the vehicle;

a second profile disposed relative to the second opening and engaged with the first profile; and a fastener received in each of the first and second openings, the fastener displacing parallel to the vehicle longitudinal axis when the second opening is rotated about the vehicle lateral axis.

2. The axle alignment system according to claim 1, wherein the first opening and first profile are formed on a first member.

3. The axle alignment system according to claim 2, wherein the first member is a bracket attached to the vehicle.

4. The axle alignment system according to claim 2, wherein the first member is attached to a bracket of the vehicle.

5. The axle alignment system according to claim 2, wherein the second opening and second profile are formed on a second member.

6. The axle alignment system according to claim 5, wherein the second member is rotationally engaged with the first member.

7. The axle alignment system according to claim 1, wherein the first profile is a recess.

8. The axle alignment system according to claim 7, wherein the recess has a circular shape.

9. The axle alignment system according to claim 8, wherein the second profile has a circular shape.

10. The axle alignment system according to claim 1, wherein the first opening has an oval shape.

11. The axle alignment system according to claim 1, wherein the second opening has an oval shape.

12. The axle alignment system according to claim 1, wherein the second profile is eccentrically positioned relative to the second opening.

13. An axle alignment system for a vehicle, the axle alignment system comprising:

a first member including a first at least partially circular profile and a first elongated opening formed therethrough, the first opening having a longitudinal axis, and the first opening longitudinal axis being laterally offset from a center of the first profile, such that the first profile is eccentrically disposed relative to the first opening;

a second member including a second at least partially circular profile and a second elongated opening formed therethrough, the second opening having a longitudinal axis and a lateral axis, the first profile being rotationally engaged with the second profile, and the first opening being at least partially aligned with the second opening; and a fastener received in the first and second openings, the fastener displacing only longitudinally relative to the vehicle when the first and second members are rotated with respect to each other.

14. The axle alignment system according to claim 13, wherein the first member is fixedly attached to the vehicle.

15. The axle alignment system according to claim 14, wherein the first member is integrally formed with a bracket of the vehicle.

16. The axle alignment system according to claim 14, wherein the first member is attached to a bracket of the vehicle.

17. The axle alignment system according to claim 13, wherein the second opening lateral axis is longitudinally offset from a center of the second profile, such that the second profile is eccentrically disposed relative to the second opening.

18. A method of aligning an axle with a lateral axis of a vehicle frame, the vehicle being of the type wherein the axle is incorporated in a suspension system of the vehicle, the suspension system including an arm attached to the axle, a bracket attached to the vehicle frame, and a fastener pivotably mounting the arm to the bracket, the method comprising the steps of:

inserting the fastener through first and second openings, the first opening being rigidly mounted relative to the vehicle frame; and rotating the second opening relative to the first opening, thereby generally horizontally, but not generally vertically, displacing the fastener relative to the bracket.

19. The method according to claim 18, wherein the rotating step further comprises rotating a first profile relative to a second profile engaged therewith, the first profile being eccentrically disposed relative to the first opening.

20. The method according to claim 19, wherein in the rotating step, the second profile is eccentrically disposed relative to the second opening.

21. The method according to claim 19, wherein in the rotating step, a longitudinal axis of the first opening is laterally offset from a center of the first profile.

22. The method according to claim 19, wherein in the rotating step, a lateral axis of the second opening is longitudinally offset from a center of the second profile.

* * * * *